L. BLOCH.
VALVE.
APPLICATION FILED JUNE 25, 1920.
1,411,904.
Patented Apr. 4, 1922.
Fig. 1.
Fig. 2.
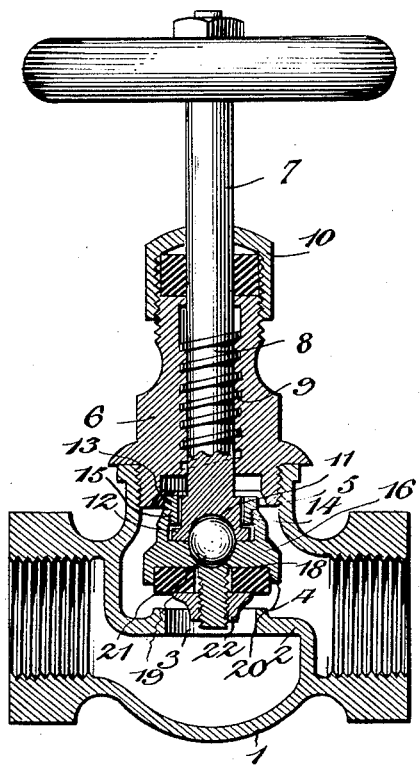
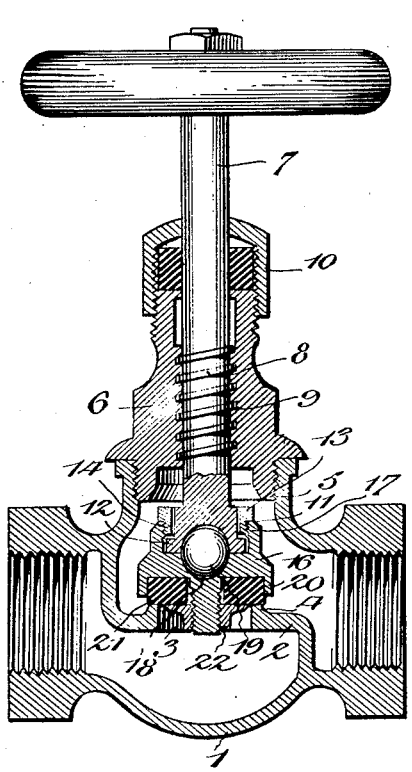
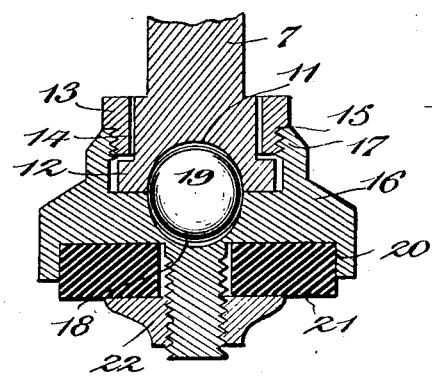
Fig. 3.
Leon Bloch.
INVENTOR
BY Victor J. Evans
ATTORNEY
WITNESS:

UNITED STATES PATENT OFFICE.

LEON BLOCH, OF BROOKLYN, NEW YORK.

VALVE.

1,411,904. Specification of Letters Patent. Patented Apr. 4, 1922.

Application filed June 25, 1920. Serial No. 391,610.

*To all whom it may concern:*

Be it known that I, LEON BLOCH, a citizen of the United States, residing at Brooklyn, in the county of Kings and State of New York, have invented new and useful Improvements in Valves, of which the following is a specification.

This invention relates to improvements in valves and one of the principal objects is to provide a self centering valve which shall be permitted a limited amount of universal movement on its valve stem so as to seat itself perfectly.

Another object is to provide a valve which will not cut the valve seat.

Another object is to provide means for eliminating objectionable noise and "chattering" occurring in the valve.

Other objects will appear from the following description and claim.

All of these objects are accomplished by the mechanism shown in the accompanying drawing comprising one sheet, in which:—

Figure 1 is a vertical sectional view of my improved valve showing the same in open position.

Figure 2 is a similar view of the valve but with the parts in closed position.

Figure 3 is an enlarged fragmentary detail view of the valve closure proper.

Like characters of reference refer to like parts in all views.

This invention contemplates the provision of a valve which is mounted for universal movement so as to perfectly seat itself, and which is provided with a seating portion of fiber or like material which will not cut or mar the valve seat. The universal movement is limited so as to prevent heavy vibration or chattering of the valve, and the ball is provided so as to obviate any angular thrust in compressing.

Referring more particularly to the drawings, 1 represents the main casting of a globe valve having a diaphragm 2 which intersects the passage in member 1, and which is provided with an aperture 3 about which is formed a valve seat 4.

Mounted in an aperture 5 of the valve body 1 is a support 6 for the vertically adjustable stem 7 which has a thread 8 working in a threaded bore 9 in member 6. A stuffing box 10 is provided to effect a tight joint between members 6 and 7.

The lower end of the stem 7 is provided with a ball seat 11 and with an annular shoulder 12, by means of which shoulder a collar 13 is loosely secured on said stem. Collar 13 is provided with a threaded portion 14 and with a shoulder 15; and a member 16 is provided with a threaded portion 17 adapted to be screwed up on portion 14 until it seats itself snugly against shoulder 15. Member 16 is provided with a ball seat 18 and a ball 19 is confined between seats 11 and 18 and is allowed a limited amount of play. The bore of section 17 of the member 16 is somewhat larger than the diameter of the annular shoulder 12, and when the end of 17 is forced into full engagement with shoulder 15, members 13 and 17 are so associated as to allow a limited amount of vertical movement and play is allowed between the member 13 and stem. Under these conditions, it will be obvious that the member 16 may have a limited universal movement on the end of the valve stem.

The lower portion of member 16 is provided with annular groove 20 in which is a seating member 21 of a fibrous composition adapted to be moved into and out of engagement with the seat 4. The member 21 is secured firmly in place by flanged sleeve member 22 which is screwed on a depending extension of member 16.

From the above description it will be seen that when the stem 7 is operated to close the valve, the limited amount of movement in the valve proper will provide for a perfect seating of the valve on the valve seat. The ball 19 accommodates itself to all positions of the seats 11 and 18 with relation to each other and in all positions will give a vertical thrust.

It is obvious that if so desired, the valve seat may be made conical instead of flat and the co-operative closure may be made a corresponding cone instead of a disk.

While I have described what I deem to be the most desirable embodiment of my invention, it is obvious that many of the details may be varied without in any way departing from the spirit of my invention; and I therefore do not limit myself to the exact details of construction herein set forth nor to anything less than the whole of my invention limited only by the appended claim.

What I claim as new and desire to secure by Letters-Patent is:—

A structure of the class described, comprising a valve body; a diaphragm therein, a valve seat in said diaphragm, a fibrous member adapted to be seated against said valve seat, a valve stem having an annular shoulder and a ball seat, a valve member adapted to co-act with said fibrous member to seat it and including a ball seat and bevel-faced element surrounding said shoulder, a ball co-acting with said ball seats, a member overlying said shoulder to secure said valve member to said stem for universal movement thereon, and a supporting member for said valve stem formed with a bevel face co-active with the bevel face of the aforesaid element for preventing chattering when said valve is opened.

In testimony whereof I have affixed my signature.

LEON BLOCH.